United States Patent
Ku et al.

(10) Patent No.: US 10,923,903 B2
(45) Date of Patent: Feb. 16, 2021

(54) LOW PHASE SURGE PROTECTION DEVICE

(71) Applicant: Lite-On Technology Corporation, Taipei (TW)

(72) Inventors: Po-Yi Ku, Taipei (TW); Chien-Lung Wang, Taipei (TW); Chung-Hsin Chen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 722 days.

(21) Appl. No.: 15/847,944

(22) Filed: Dec. 20, 2017

(65) Prior Publication Data

US 2019/0027921 A1 Jan. 24, 2019

(30) Foreign Application Priority Data

Jul. 20, 2017 (TW) .................................. 106124331
Nov. 6, 2017 (CN) .......................... 201711076538.0

(51) Int. Cl.
*H02H 3/20* (2006.01)
*H02H 7/12* (2006.01)
*H02H 11/00* (2006.01)
*H02H 1/06* (2006.01)

(52) U.S. Cl.
CPC ............ *H02H 3/20* (2013.01); *H02H 7/1216* (2013.01); *H02H 11/006* (2013.01); *H02H 1/06* (2013.01)

(58) Field of Classification Search
CPC .......... H02H 11/006; H02H 1/06; H02H 3/20; H02H 7/1216
USPC .................................. 361/18, 90, 91.1, 91.3
See application file for complete search history.

(56) References Cited

U.S. PATENT DOCUMENTS

| | | | | |
|---|---|---|---|---|
| 3,480,834 A | * | 11/1969 | Billings | .................... H02H 3/20 361/91.3 |
| 7,746,671 B2 | * | 6/2010 | Radecker | .......... H02M 3/33507 363/21.03 |
| 2011/0248640 A1 | * | 10/2011 | Welten | ................ H05B 45/3575 315/210 |

* cited by examiner

*Primary Examiner* — Jared Fureman
*Assistant Examiner* — Nicolas Bellido
(74) *Attorney, Agent, or Firm* — JCIPRNET

(57) ABSTRACT

The invention provides a low phase surge protection device including a voltage converter, a low phase delay detector and an output control switch. The voltage converter receives an alternate current (AC) input voltage, and converts the AC input voltage into a direct current (DC) input voltage. The low phase delay detector receives the DC input voltage to be a power source, enables a phase detection scheme by detecting whether the AC input voltage is in a stable state, and generates an enable signal by detecting a phase of the AC input voltage after the phase detection scheme is enabled. The output control switch receives the AC input voltage, and determines whether to transmit the AC input voltage to be an output voltage according to the enable signal.

22 Claims, 4 Drawing Sheets

LOW PHASE SURGE PROTECTION DEVICE

CROSS REFERENCE TO RELATED APPLICATION

This application claims the priority benefit of Taiwan application serial no. 106124331, filed on Jul. 20, 2017 and China application serial no. 201711076538.0, filed on Nov. 6, 2017. The entirety of the above-mentioned patent application is hereby incorporated by reference herein and made a part of specification.

BACKGROUND OF THE INVENTION

1. Field of the Invention

The invention relates to a low phase surge protection device, and more particularly, to a delayed start type low phase surge protection device.

2. Description of Related Art

In alternate current (AC) power systems, taking an automatic power system for a street light for example, in the operation of providing the AC power to the street light, the phenomenon of a surge current will occur each time when a switch for control power supply is being switched. When the surge current is applied to a circuit equipment, it is like to cause deterioration or damage on circuit elements therein. Especially, if a time point when the switch is turned on is exactly the same to a time point when the AC voltage is at a high phase, a current value of the generated surge current will be very high to seriously affect a proper rate of the circuit equipment.

In the existing technical field, a surge protector is usually used as a protecting element for the surge current. However, the existing surge protector can only provide protection actions for limited energy. In the case of the surge current of aforementioned type, the existing surge current is unable to effectively protect the circuit elements.

SUMMARY OF THE INVENTION

The invention is directed to a low phase surge protection device, which is capable of protecting a switch from a possible large instantaneous current generated when the switch is turned on.

The low phase surge protection device of the invention includes a voltage converter, a low phase delay detector, and an output control switch. The voltage converter receives an alternate current (AC) input voltage, and converts the AC input voltage into a direct current (DC) input voltage. The low phase delay detector is coupled to the voltage converter, receives the DC input voltage to be a power voltage, enables a phase detection scheme by detecting whether the AC input voltage is in a stable state, and generates an enable signal by detecting a phase of the AC input voltage after the phase detection scheme is enabled. The output control switch is coupled to the low phase delay detector, receives the AC input voltage, and determines whether to transmit the AC input voltage to be an output voltage according to the enable signal.

In an embodiment of the invention, the phase detector includes a stable voltage detector, a phase detector and an over-voltage protection circuit. The stable voltage detector receives the AC input voltage, and determines whether to enable the phase detection scheme according to a comparison of a voltage peak of the AC input voltage with a first reference voltage. The phase detector is coupled to the stable voltage detector, wherein the phase detector generates the enable signal according to a comparison of a voltage value of the AC input voltage with a second reference voltage after the phase detection scheme is enabled. The over-voltage protection circuit is coupled to the phase detector, receives the AC input voltage, and generates an over-voltage protection signal according to a comparison of the voltage peak of the AC input voltage with a third reference voltage. The over-voltage protection signal is configured to determine whether to enable an over-voltage protection action.

In an embodiment of the invention, when the voltage peak of the AC input voltage is greater than the first reference voltage, the stable voltage detector enables the phase detection scheme.

In an embodiment of the invention, after the phase detection scheme is enabled, the phase detector enables the enable signal and turns on the output control switch when the voltage value of the AC input voltage is smaller than the second reference voltage.

In an embodiment of the invention, the stable voltage detector includes a voltage regulator and a comparator. The voltage regulator performs a low pass filter operation on the AC input voltage to obtain a regulated input voltage representing the voltage peak of the AC input voltage. The comparator is coupled to the voltage regulator, receives the regulated input voltage and the first reference voltage, and generates a determination signal according to a comparison of the regulated input voltage with the first reference voltage.

In an embodiment of the invention, the stable voltage detector further includes an auxiliary circuit. The stable voltage detector receives the determination signal and generates the auxiliary signal according to the determination signal.

In an embodiment of the invention, the comparator includes an operational amplifier and a feedback resistor. The positive input terminal of the operational amplifier receives the regulated input voltage, a negative input terminal of the operational amplifier receives the first reference voltage, and an output terminal of the operational amplifier generates the determination signal. The feedback resistor is coupled between the positive input terminal of the operational amplifier and the output terminal of the operational amplifier. The operational amplifier receives the DC input voltage to be the power voltage.

In an embodiment of the invention, the stable voltage detector further includes a regulator circuit. The regulator circuit is coupled to the negative input terminal of the operational amplifier, and generates the first reference voltage according to the DC input voltage.

In an embodiment of the invention, the regulator circuit further includes a capacitor, a resistor and a Zener diode. The capacitor is coupled between the negative input terminal of the operational amplifier and a reference ground terminal. The resistor has one terminal receiving the DC input voltage and another terminal coupled to the negative input terminal of the operational amplifier. The Zener diode has a cathode terminal coupled to the negative input terminal of the operational amplifier and an anode terminal coupled to the reference ground terminal.

In an embodiment of the invention, the auxiliary circuit includes a first resistor, a first transistor, a second resistor and a second transistor. A first terminal of the first resistor receives the determination signal. A control terminal of the first transistor is coupled to a second terminal of the first resistor. The second resistor has a first terminal receiving the DC input voltage and a second terminal coupled to a first terminal of the first transistor. The second transistor has a first terminal generating the auxiliary signal and a control terminal coupled to the first terminal of the first transistor. A second terminal of the second transistor and a second terminal of the first transistor are commonly coupled to a reference ground terminal.

In an embodiment of the invention, the over-voltage protection circuit includes a voltage division circuit, an operational amplifier, a first resistor, a second resistor, a third resistor and a transistor. The voltage division circuit divides the AC input voltage. The operational amplifier compares an output of the voltage division circuit with the third reference voltage. The first resistor is serially connected between an output terminal and a positive input terminal of the operational amplifier. The second resistor is coupled to the output terminal of the operational amplifier. The third resistor is serially connected between the second resistor and a reference ground terminal. The transistor has a control terminal coupled to a coupled terminal of the second terminal and the third terminal, a first terminal generating the over-voltage protection signal and a second terminal coupled to the reference ground terminal.

In an embodiment of the invention, the phase detector includes a first voltage division circuit, a second voltage division circuit and an operational amplifier. The first voltage division circuit receives the determination signal, the auxiliary signal and the over-voltage protection signal, and generates the second reference voltage in accordance with the determination signal, in accordance with the auxiliary signal or in accordance with the over-voltage protection signal. The second voltage division circuit receives the AC input voltage, and generates a divided input voltage by dividing the AC input voltage. The operational amplifier has a positive input terminal receiving the second reference voltage and a negative input terminal receiving the divided input voltage, wherein the operational amplifier generates the enable signal at an output terminal thereof by comparing whether the second reference voltage is greater than the divided input voltage.

In an embodiment of the invention, the phase detector further includes a diode and a resistor. The diode has an anode coupled to an output terminal of the operational amplifier and a cathode coupled to the positive input terminal of the operational amplifier. The resistor is coupled with the diode in series between the output terminal of the operational amplifier and the positive input terminal of the operational amplifier.

In an embodiment of the invention, the low phase surge protection device further includes a switch driving circuit. The switch driving circuit is coupled between the low phase delay detector and the output control switch, generates a drive signal according to the enable signal, and provides the drive signal so that the output control switch is turned on or cut off.

In an embodiment of the invention, the switch driving circuit includes a first resistor, a second resistor, a transistor, a capacitor and a diode. One terminal of the resistor receives the enable signal. The second resistor is coupled between a second terminal of the first resistor and a reference ground terminal. The transistor has a control terminal coupled to a second terminal of the first resistor and a first terminal coupled to the reference ground terminal. The capacitor is coupled between the control terminal of the transistor and the reference ground terminal. The diode has a cathode receiving the DC input voltage and an anode coupled to the second terminal of the transistor. The drive signal is provided between the cathode and the anode of the diode.

In an embodiment of the invention, the low phase delay detector further receives a power supply command, and enables the phase detection scheme according to the power supply command.

In an embodiment of the invention, the low phase surge protection device further includes a surge protection device. The surge protection device is coupled between paths of the voltage converter and the output control switch for receiving the AC input voltage, and executes a surge protection operation on the AC input voltage.

In an embodiment of the invention, the surge protection device is a voltage-sensitive resistor.

In an embodiment of the invention, the low phase surge protection device further includes a voltage output indicating device. The voltage output indicating device is coupled to a node of the output control switch for generating the output voltage, and configured to indicate whether the output voltage is generated.

In an embodiment of the invention, the voltage output indicating device is an indicating light.

In an embodiment of the invention, the output control switch is a solid-state switch.

In an embodiment of the invention, after the phase detection scheme is enabled, the low phase delay detector generates the enable signal according to whether the phase of the AC input voltage is less than 20°, and turns on the output control switch through the enable signal when the phase of the AC input voltage is less than 20°.

Based on the above, in the invention, after the AC input power is stabilized, the output control switch is turned on by detecting the phase of the AC input power at the time point when the AC input power is relatively low, so as to provide the AC input power to an electronic apparatus through the output control switch. Accordingly, the electronic apparatus will not generate the large instantaneous current when receiving the AC input power with the high voltage value, so as to effectively prevent the electronic apparatus from damages due to the possible large instantaneous current.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
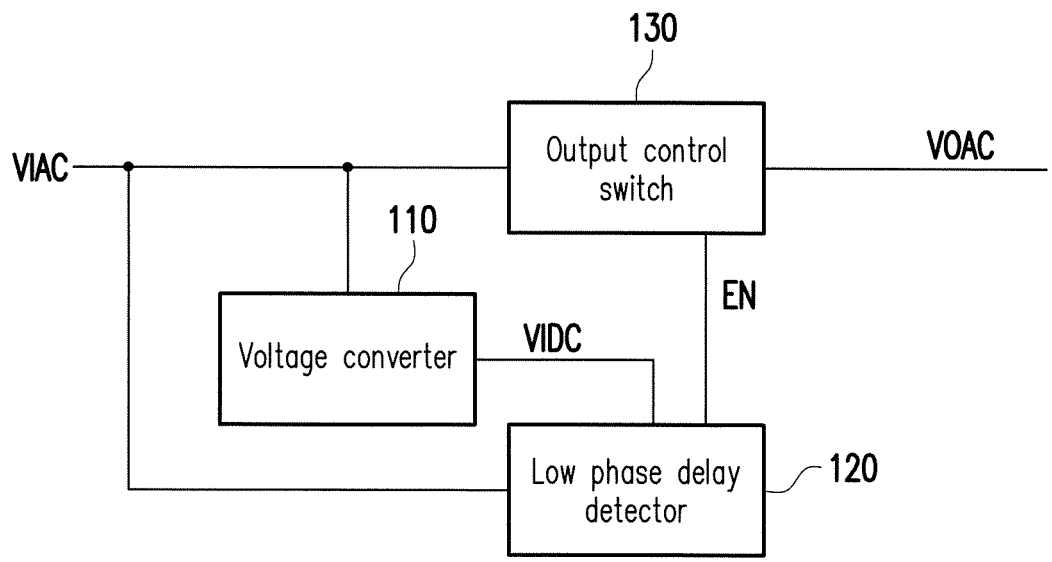
FIG. 1 is a schematic diagram illustrating a low phase surge protection device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

With reference to FIG. 1, FIG. 1 is a schematic diagram illustrating a low phase surge protection device according to an embodiment of the invention. The low phase surge protection device 100 includes a voltage converter 110, a low phase delay detector 120, and an output control switch 130. The voltage converter 110 receives an alternate current (AC) input voltage VIAC. The voltage converter 110 converts the AC input voltage VIAC to generate a direct current (DC) input voltage VIDC. Here, the voltage converter 110 is an AC-to-DC voltage converter. For instance, the voltage converter 110 may be a full wave rectifier (e.g., a bridge rectifier) or a half-wave rectifier.

The low phase delay detector 120 is coupled to the voltage converter 110. The low phase delay detector 120 receives the AC input voltage VIAC, and receives the DC input voltage VIDC generated by the voltage converter 110. The low phase delay detector 120 enables a phase detection scheme by detecting whether the AC input voltage VIAC is in a stable state. Further, under the circumstance where the phase detection scheme is enabled, the low phase delay detector 120 can generate an enable signal EN by detecting a phase of the AC input voltage VIAC.

Specifically, the low phase delay detector 120 can compare a voltage peak of the AC input voltage VIAC with a voltage value of a first reference voltage. When the voltage peak of the AC input voltage VIAC is greater than a voltage value of the first reference voltage, it means that the AC input voltage VIAC is raised to the stable state and is sufficient for providing power to a connected electronic apparatus to be a working power. Conversely, when the voltage peak of the AC input voltage VIAC is not greater than the voltage value of the first reference voltage, it means that the AC input voltage VIAC is not in the stable state yet and is insufficient for providing power to the connected electronic apparatus to be its working power.

More specifically, after the low phase delay detector 120 determines that the AC input voltage VIAC is in the stable state, the low phase delay detector 120 can enable the phase detection scheme and generate the enable signal EN through the phase detection scheme. There, under the circumstance where the phase detection scheme is enabled, the low phase delay detector 120 can detect the phase of the input voltage VIAC and enables the enable signal EN when a phase angle of the input voltage VIAC is lower than a predetermined phase angle.

In the present embodiment, the enable signal EN may be a logic signal, and the enable signal EN may be a first logical level when the enable signal EN is not yet enabled. Conversely, when the enable signal EN is enabled, the enable signal EN may be a second logic level, wherein the first logic level and the second logic level are complementary.

On the other hand, the low phase delay detector 120 receives the DC input voltage VIDC generated by the voltage converter 110 to be the working power. Accordingly, the low phase delay detector 120 can effective operate without an additional power supply (e.g., installing a battery) for providing the working power.

The output control switch 130 receives the AC input voltage VIAC, and is coupled to the low phase delay detector 120 to receive the enable signal EN. When the enable signal EN is in an enabled state, the output control switch 130 is turned on to allow the AC input voltage VIAC to pass through and provide an output voltage VOAC. Conversely, if the enable signal EN is not in the enabled state, the output control switch 130 is cut off, and a path for transmitting the AC input voltage VIAC to be output voltage VOAC is cut off. Therefore, the input voltage VIAC is not provided to the electronic apparatus.

In addition, the voltage value of the first reference voltage as described above is a predetermined voltage value, which can be set according to a specification of a power supply grid of the AC input voltage VIAC. In brief, if a maximum voltage peak of the AC input voltage VIAC supplied by the power supply grid is 220V, the voltage value of the first reference voltage may be set to a product of 220V and an appropriate proportion (e.g., 60%). Naturally, if the maximum voltage peak of the AC input voltage VIAC supplied by the power supply grid is 110V, the voltage value of the first reference voltage may then be set to a product of 110V and an appropriate proportion (e.g., 60%).

Settings regarding predetermined phase angle as described above can be adjusted by the designer according to a magnitude of the surge current generated when output control switch 130 is turned on in the actual operating state. Naturally, when the predetermined phase angle is more approximate to 0 degree, the magnitude of the surge current may be lower.

In the present embodiment, the output control switch 130 may be a solid-state switch (e.g., a solid-state relay), which can, when the enabled signal EN enabled, generate a magnetic field according to the enabled enable signal EN and attract a conductive structure between two ends of the output control switch 130. As such, the two ends of the output control switch 130 are interconnected to turn the AC input voltage VIAC into the output voltage VOAC to be provided to the electronic apparatus at back stage.

Incidentally, in the embodiments of the invention, the low phase delay detector 100 can receive a power supply command, and enable the phase detection scheme according to the power supply command. Further, after a voltage value of the AC input voltage VIAC is stable, the low phase delay detector 100 determines a time point for turning on the output control switch 130 by detecting the phase of the AC input voltage VIAC, so as to effectively reduce an instantaneous current generated at the moment when the power is supplied.

Figure 2:
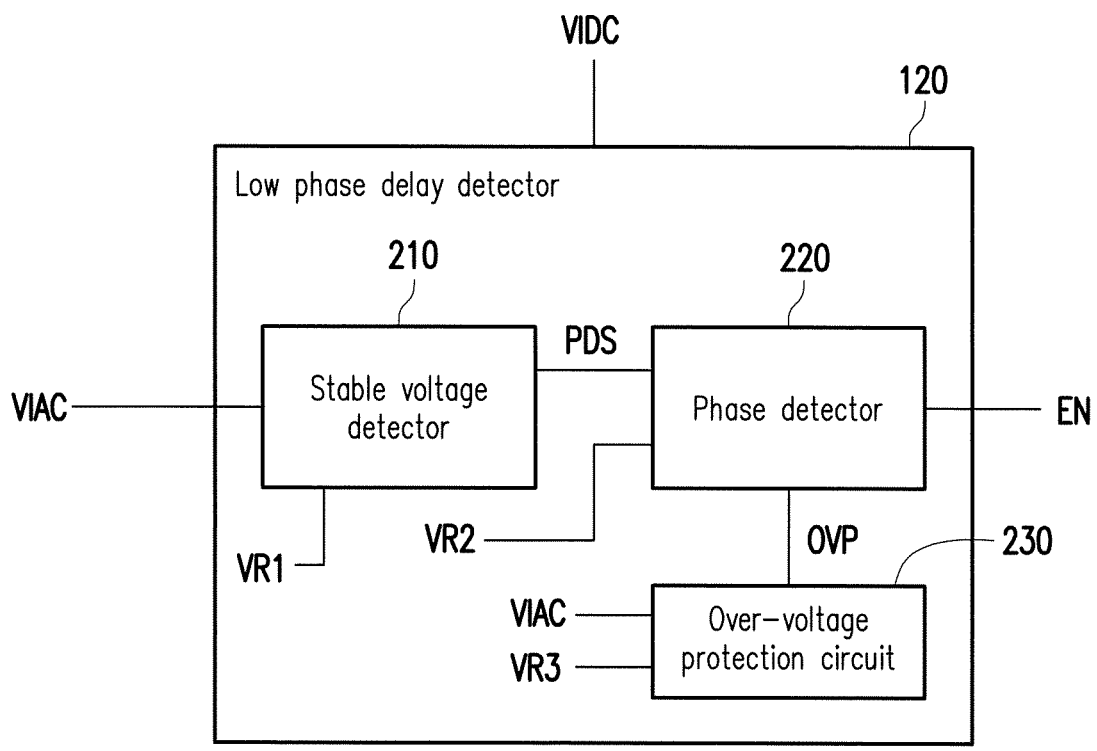
FIG. 2 is a schematic diagram illustrating an implementation of a low phase delay detector according to an embodiment of the invention.

The following refers to FIG. 2, and FIG. 2 is a schematic diagram illustrating an implementation of a low phase delay detector according to an embodiment of the invention. The low phase delay detector 120 receives the DC input voltage VIDC generated by the voltage converter 110 to be the working voltage, and the low phase delay detector 120 includes a stable voltage detector 210, a phase detector 220 and an over-voltage protection circuit 230. The stable voltage detector 210 is coupled to the phase detector 220. The stable voltage detector 210 receives the AC input voltage VIAC, and determines whether to enable the phase detection scheme according to a comparison of the voltage peak of the AC input voltage VIAC with a first reference voltage VR1. Specifically, when the stable voltage detector 210 determines that the voltage peak of the AC input voltage VIAC is greater than the first reference voltage VR1, it can be determined that the AC input voltage VIAC is in the stable state. The stable voltage detector 210 can generate a determination signal PDS which instructs the phase detection scheme to be enabled. Conversely, when the stable voltage detector 210 determines that the voltage peak of the AC input voltage VIAC is not greater than the first reference voltage VR1, it can be determined that the AC input voltage VIAC is not in the stable state yet. The stable voltage detector 210 can generate a determination signal PDS which instructs the phase detection scheme not to be enabled.

The over-voltage protection circuit 230 is coupled to the phase detector 220, receives the AC input voltage VIAC, and compares the voltage peak of the AC input voltage VIAC with a third reference voltage VR3. When the voltage peak of the AC input voltage VIAC is overly high (greater than the third reference voltage VR3), an over-voltage protection function is enabled. When the over-voltage protection function is enabled, the over-voltage protection circuit 230 generates an over-voltage instructing signal OVP. With the over-voltage instructing signal OVP, the over-voltage protection circuit 230 can disable the enable signal EN generated by the phase detector 220, and correspondingly cut off the output control switch 130.

The phase detector 220 receives the determination signal PDS and the over-voltage instructing signal OVP. With respect to the phase detector 220, when the determination signal PDS instructs the phase detection scheme to be enabled, the phase detector 220 generate the enable signal EN by comparing the voltage value of the AC input voltage VIAC with a voltage value of a second reference voltage VR2. Specifically, the phase detector 220 compares the voltage value of the AC input voltage VIAC with the voltage value of the second reference voltage VR2, and when the voltage value of the AC input voltage VIAC is smaller than the voltage value of the second reference voltage VR2, a time point when a low phase occurs on the AC input voltage VIAC can be determined and the enable signal EN is then enabled at such time point. With the enabled enable signal EN, the output control switch 130 may be turned on and the output voltage VOAC may be successfully supplied. On the other hand, when receiving the over-voltage instructing signal OVP for instructing the over-voltage protection function to be enabled, the phase detector 220 forces the generated enable signal EN to enter a disable state so that the output control switch 130 is cut off.

Figure 3:
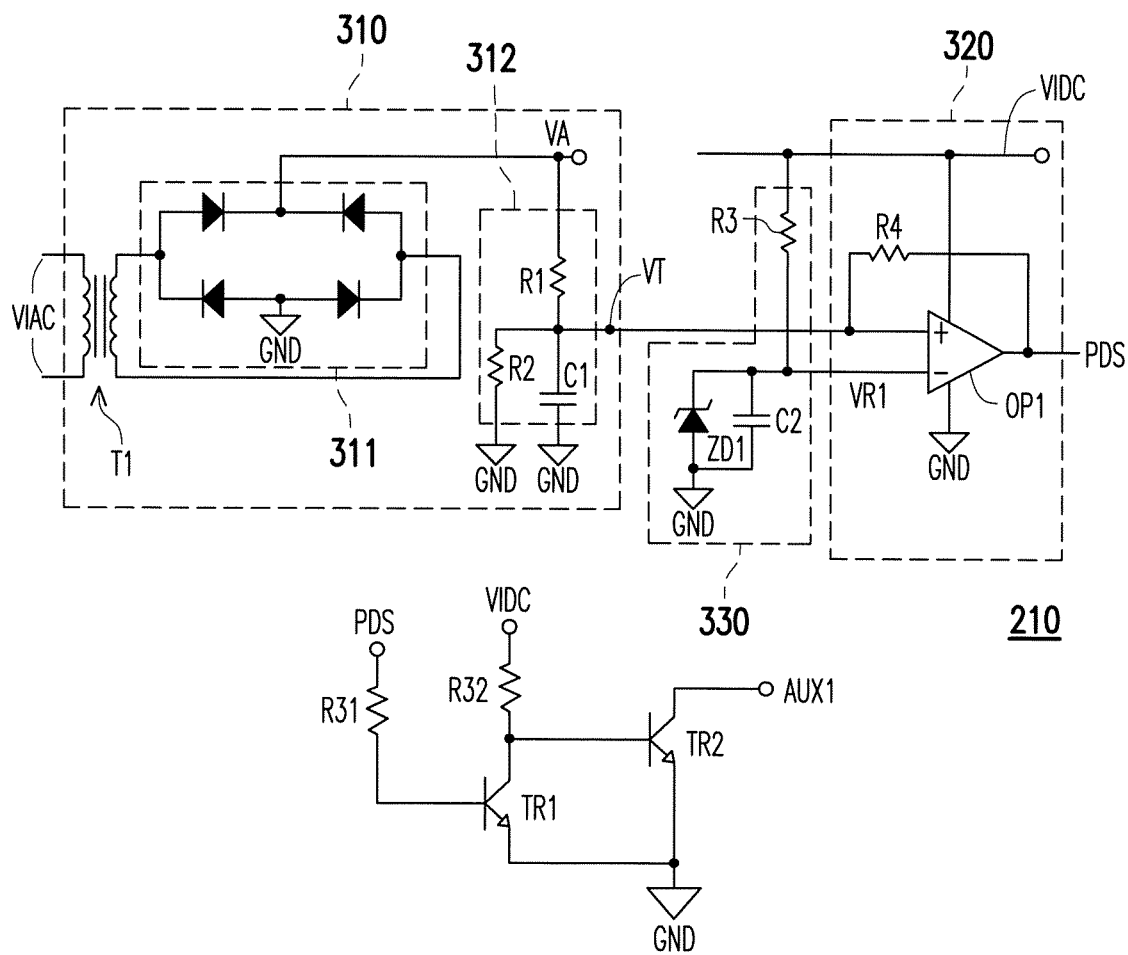
FIG. 3, FIG. 4 and FIG. 5 are schematic diagrams respectively illustrating implementations of a stable voltage detector, an over-voltage protection circuit and a phase detector.
Figure 4:
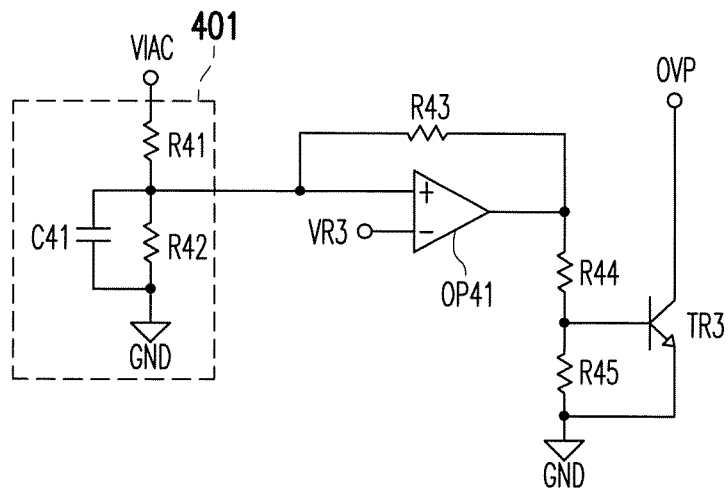
Figure 5:
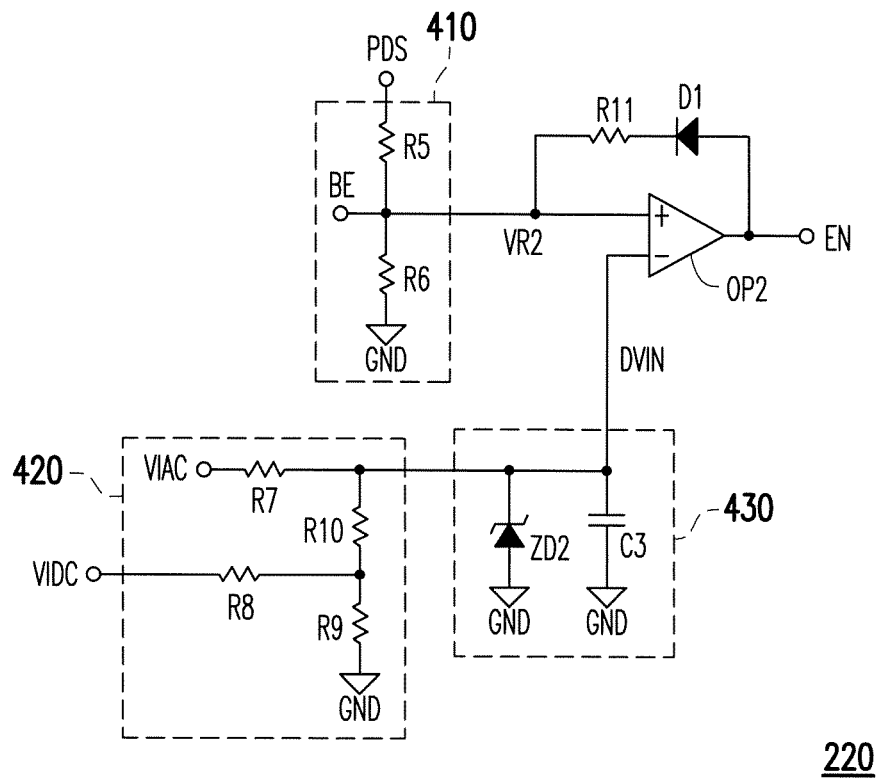

Detail implementations regarding the stable voltage detector 210, the phase detector 220 and the over-voltage protection circuit 230 can refer to the implementations of the stable voltage detector, the over-voltage protection circuit and the phase detector respectively illustrated in FIG. 3, FIG. 4 and FIG. 5. In FIG. 3, the stable voltage detector 210 includes a voltage regulator 310 and a comparator 320. The voltage regulator 310 includes a transformer T1, a rectifier 311 and a filter 312. The AC input voltage VIAC undergoes voltage-conversion, rectification and filter operations sequentially executed by the transformer T1, the rectifier 311 and the filter 312 to generate a regulated input voltage VT. The transformer T1 can be used to lower the voltage value of the AC input voltage VIAC. The rectifier 311 may be a bridge rectifier, and the filter 312 may be a low-pass filter constituted by the resistors R1 and R2 and a capacitor C1. In the filter 312, one terminal of the resistor R1 receives a voltage VA generated by the rectifier 311, and another terminal of the resistor R1 generates the regulated input voltage VT. The resistor R2 and the capacitor C1 are coupled in series between a node for generating the regulated input voltage VT and a reference ground terminal GND.

The regulated input voltage VT is transmitted to the comparator 320. The comparator 320 includes an operational amplifier OP1 and a feedback resistor R4. The feedback resistor R4 is serially connected between a positive input terminal and an output terminal of the operational amplifier OP1. The feedback resistor R4 is used as a delayed interval voltage point regulation, and configured to set up a voltage point for shut down. In addition, the positive input terminal of the operational amplifier OP1 receives the regulated input voltage VT, a negative input terminal of the operational amplifier OP1 receives the first reference voltage VR1, and the output terminal of the operational amplifier OP1 generates the determination signal PDS. In the present embodiment, the operational amplifier OP1 receives the DC input voltage VIDC to be a power voltage. Furthermore, the first reference voltage VR1 is generated by a regulator circuit 330.

The regulator circuit 330 includes a resistor R3, a capacitor C2 and a Zener diode ZD1. One terminal of the resistor R3 receives the DC input voltage VIDC, and another terminal of the resistor R3 is coupled to a first terminal of the capacitor C2 and a cathode terminal of the Zener diode ZD1. A second terminal of the capacitor C2 and an anode terminal of the Zener diode ZD1 are commonly coupled to the reference ground terminal GND. When a voltage value of the DC input voltage VIDC is greater than a breakdown voltage of the Zener diode ZD1, a voltage difference between the cathode terminal and the anode terminal (coupled to the reference ground terminal GND) of the Zener diode ZD1 may be equal to a voltage value of the breakdown voltage. Accordingly, the Zener diode ZD1 can provide the first reference voltage VR1 stably at its cathode terminal.

In view of the above description, it can be known that, in the implementation of FIG. 3, when the voltage peak of the AC input voltage VIAC is raised to the sufficiently high voltage value to be in the stable state, the regulated input voltage VT generated according to the voltage peak of the AC input voltage VIAC can be greater than the first reference voltage VR1 so the operational amplifier OP1 generates the determination signal PDS with a relatively high voltage. Conversely, when the voltage peak of the AC input voltage VIAC is not raised to the sufficiently high voltage value to be in the stable state, the regulated input voltage VT generated according to the voltage peak of the AC input voltage VIAC cannot be greater than the first reference voltage VR1 so the operational amplifier OP1 generates the determination signal PDS with a relatively low voltage.

In addition, the stable voltage detector 210 also includes an auxiliary circuit constituted by transistors TR1 and TR2 and resistors R31 and R32. Among them, a control terminal of the transistor TR1 receives the determination signal PDS through the resistor R31, and a first terminal of the transistor TR1 receives the DC input voltage VIDC through the resistor R32. A control terminal of the transistor TR2 is coupled to the first terminal of the transistor TR1, a first terminal of the transistor TR2 generates an auxiliary signal AUX1, and second terminals of the transistors TR1 and TR2 are commonly coupled to the reference ground terminal GND. The auxiliary circuit is configured to detect a voltage state of the determination signal PDS. Here, when the regulated input voltage VT cannot be greater than the first voltage VR1, the determination signal PDS has a relatively low voltage value. In this case, the transistor TR1 is correspondingly cut off, and the transistor TR2 is correspondingly turned on. In this way, the auxiliary circuit can generate the auxiliary signal AUX1 with a relatively low voltage. The auxiliary signal AUX1 is to be transmitted to the phase detector 220, and related functions thereof will be described in detail in the following action details of the phase detector 220.

In FIG. 4, the over-voltage protection circuit 230 includes a voltage division circuit 401, an operational amplifier OP41, resistors R43 to R45 and a transistor TR3. The voltage division circuit 401 includes the resistors R41 and R42 coupled in series, and a capacitor C41 connected in parallel with the resistor R42. The voltage division circuit 401 receives the AC input voltage VIAC, and performs rectification and voltage division actions on the AC input voltage VIAC. An output terminal of the voltage division circuit 401 is coupled to a positive input terminal of the operational amplifier OP41. A negative input terminal of the operational amplifier OP41 receives the third reference signal VR3. By comparing an output of the voltage division circuit 401 with the third reference signal VR3, the operational amplifier OP41 generates a signal to drive the transistor TR3, and accordingly generates the over-voltage protection signal OVP. In the present embodiment, when the over-voltage protection signal OVP is equal to a ground voltage, it means that an over-voltage protection action is enabled.

In FIG. 5, the phase detector 220 includes voltage division circuits 410 and 420, an operational amplifier OP2, a diode D1 and a resistor R11. The voltage division circuit 410 has resistors R5 and R6 coupled in series. The resistors R5 and R6 are coupled to a node BE. Here, the node BE is coupled to a node of the over-voltage protection circuit 230 for generating the over-voltage protection signal OVP as well as a node of the stable voltage detector 210 for generating the auxiliary signal AUX1 at the same time. The voltage division circuit 410 receives the determination signal PDS, and divides the determination signal PDS to generate the second reference voltage VR2. The voltage division circuit 420 includes a plurality of resistors R7 to R10, and receives the AC input voltage VIAC and the DC input voltage VIDC. The voltage division circuit 420 divides the AC input voltage VIAC based on the DC input voltage VIDC to generate a divided input voltage DVIN. Here, a voltage value of the divided input voltage DVIN may be greater than a voltage value of a ground voltage on the reference ground terminal GND.

A positive input terminal of the operational amplifier OP2 receives the second reference voltage VR2, and a negative input terminal of the operational amplifier OP2 receives the divided input voltage DVIN. The operational amplifier OP2 then generates the enable signal EN according to a comparison of the second reference voltage VR2 with the divided input voltage DVIN. Further, the resistor R11 is coupled with the diode D1 in series between an output terminal of the operational amplifier OP2 and the positive input terminal of the operational amplifier OP2. Here, the diode D1 is forwardly biased between the output terminal of the operational amplifier OP2 and the positive input terminal of the operational amplifier OP2.

More specifically, when the determination signal PDS with the relatively high voltage is generated, the phase detection scheme is enabled. The voltage division circuit 410 divides the determination signal PDS to generate the second reference voltage VR2. Meanwhile, the voltage division circuit 420 divides the AC input voltage VIAC to generate the divided input voltage DVIN. The operational amplifier OP2 compares a voltage magnitude relationship between the divided input voltage DVIN and the second reference voltage VR2, and learns that, at a time point when the divided input voltage DVIN is smaller than the second reference voltage VR2, the AC input voltage VIAC is in a low phase state. By doing so, the operational amplifier OP2 can correspondingly generate an enabled enable signal EN. Conversely, at a time point when the divided input voltage DVIN is not smaller than the second reference voltage VR2, the AC input voltage VIAC is in a high phase state. By doing so, the operational amplifier OP2 can correspondingly generate a disabled enable signal EN. Here, the enabled enable signal EN can turn on the output control switch 130 to generate the output voltage VOAC, and the disabled enable signal EN can cut off the output control switch 130 to cut off generation of the output voltage VOAC. Here, it should be noted that, if the enable signal EN is enabled, the second voltage VR2 may be maintained at a relatively high voltage value through a loop formed by the diode D1 and the resistor R11. In this case, with a normal variation in the voltage value of the AC input voltage VIAC, the operational amplifier OP2 can continuously generate the enabled enable signal EN, continuously turn on the output control switch 130 and generate the output voltage VOAC.

It should be noted that, when the determination signal PDS with the relatively low voltage is generated, the phase detection scheme is disabled. At that time, the voltage value of the second reference voltage VR2 generated from the determination signal PDS divided by the voltage division circuit 410 will be very low. Also, the node BE can receive the auxiliary signal AUX1 having a low voltage level, which can effectively break the loop for pulling up voltage as formed by the diode D1 and the resistor R11 and effectively pull down the voltage value of the second reference voltage VR2. Therefore, the voltage value of the divided input voltage DVIN will be greater than the voltage value of the second reference voltage VR2, so the operational amplifier OP2 generates the disabled enable signal EN.

On the other hand, when the over-voltage protection action is enabled, the over-voltage protection signal OVP may also be break the loop for pulling up voltage as formed by the diode D1 and the resistor R11 through the node BE, and pull down the voltage value of the second reference voltage VR2. Then, the voltage value of the divided input voltage DVIN will be greater than the voltage value of the second reference voltage VR2 so the operational amplifier OP2 generates the disabled enable signal EN. As such, the output control switch 130 may be cut off, and generation of the output voltage VOAC may be cut off.

Incidentally, in the present embodiment, the phase detector 220 further includes a regulator circuit 430. The regulator circuit 430 is coupled to the negative input terminal of the operational amplifier OP2 and includes a Zener diode ZD2 and a capacitor C3. Here, the regulator circuit 430 is configured to stabilize a voltage value on the negative input terminal of the operational amplifier OP2 so that the voltage value on the negative input terminal of the operational amplifier OP2 cannot be greater than a breakdown voltage of the Zener diode ZD2.

Figure 6:
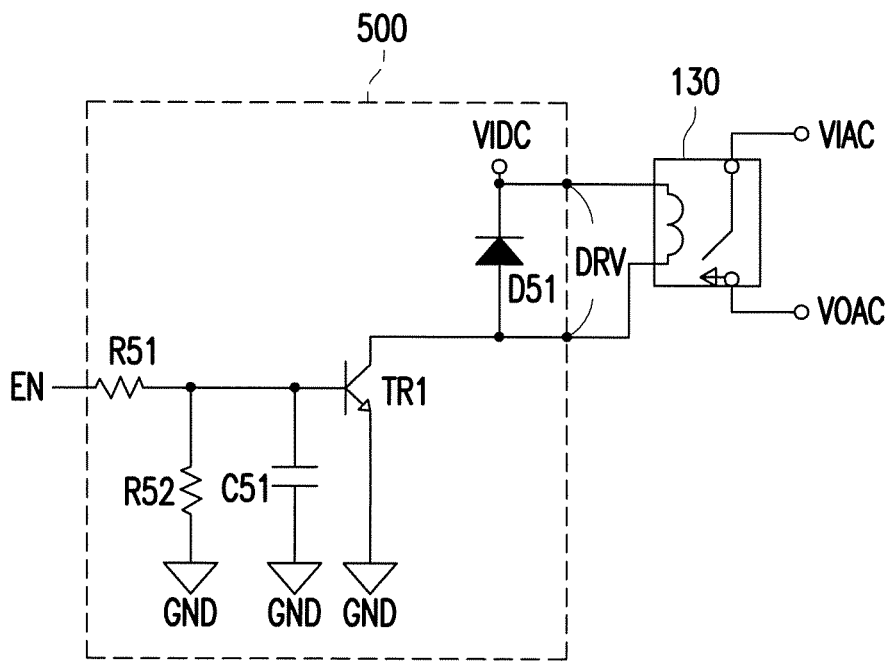
FIG. 6 is a schematic diagram illustrating a switch driving circuit according to an embodiment of the invention.

The following refers to FIG. 6, and FIG. 6 is a schematic diagram illustrating a switch driving circuit according to an embodiment of the invention. A switch driving circuit 500 is serially connected between the low phase delay detector 120 and the output control switch 130. The switch driving circuit 500 receives the enable signal EN, and generates a drive signal DRV according to the enable signal EN. The drive signal DRV is provided to the output control switch 130 so that the output control switch 130 is turned on or cut off.

In the present implementation, the switch driving circuit 500 is constructed by an amplifier constituted by including resistors R51 and R52, a capacitor C51, a transistor TR1 and a diode D51. One terminal of the resistor R51 receives the enable signal EN. The resistor R52 is coupled between a second terminal of the resistor R51 and the reference ground terminal GND. A control terminal of the transistor TR1 is coupled to a second terminal of the resistor R51, and a first terminal of the transistor TR1 is coupled to the reference ground terminal GND. The capacitor C51 is coupled between the control terminal of the transistor TR1 and the reference ground terminal GND. The diode D51 has a cathode receiving the DC input voltage VIDC, and an anode coupled to the second terminal of the transistor TR1. Here, the drive signal DRV is provided between the cathode and the anode of the diode D51. When the enable signal EN is in the enabled state, the drive signal DRV correspondingly generated by the switch driving circuit 500 can drive the output control switch 130 to be turned on, so that the AC input voltage VIAC is transmitted to be the output voltage VOAC. Conversely, when the enable signal EN is in the disabled state, the drive signal DRV correspondingly generated by the switch driving circuit 500 can drive the output control switch 130 to be cut off, so that a path for transmitting the AC input voltage VIAC is cut off.

Figure 7:
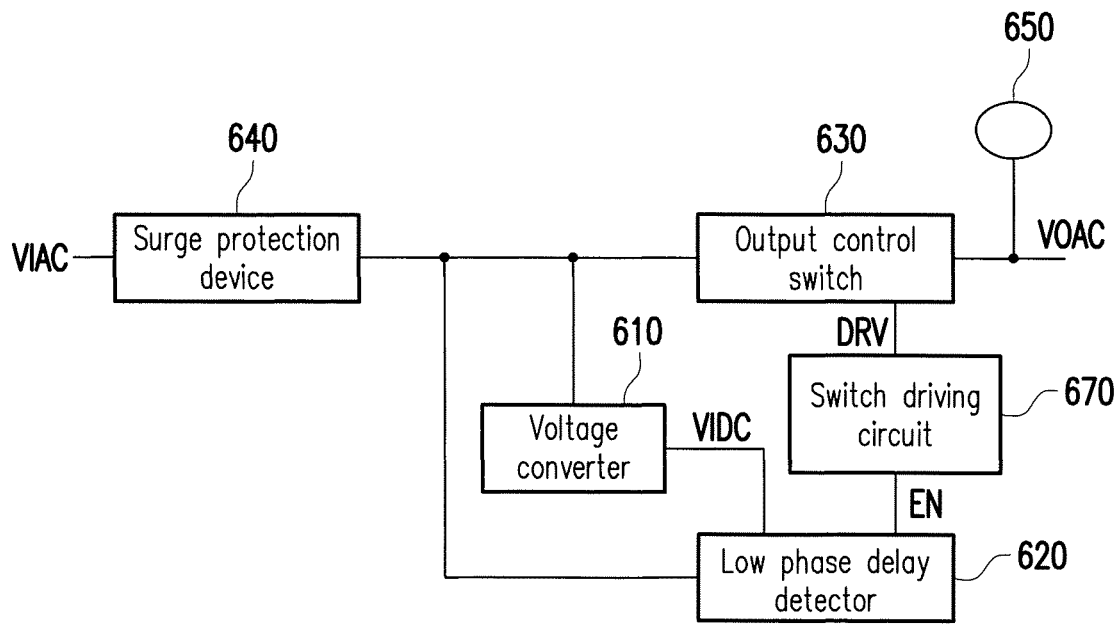
FIG. 7 is a schematic diagram illustrating a low phase surge protection device according to another embodiment of the invention.

The following refers to FIG. 7, and FIG. 7 is a schematic diagram illustrating a low phase surge protection device according to another embodiment of the invention. A low phase surge protection device 600 includes a voltage converter 610, a low phase delay detector 620, an output control switch 630, a surge protection device 640, a voltage output indicating device 650 and a switch driving circuit 670. Unlike the foregoing embodiments, in the present embodiment, the surge protection device 640 is disposed at front end of the low phase surge protection device 600, and a surge protection operation is executed on the surge current generated by the AC input voltage VIAC. In the present embodiment, the surge protection device 640 may be a voltage-sensitive resistor.

Moreover, in the present embodiment, the voltage output indicating device 650 is additionally disposed on a node for generating the output voltage VOAC. The voltage output indicating device 650 is configured to receive the output voltage VOAC. Also, when the output voltage VOAC is being generated, the voltage output indicating device 650 can clearly indicate that the output voltage VOAC has been successfully generated. In the embodiments of the invention, the voltage output indicating device 650 may be an indicating light (e.g., a light-emitting diode). With the voltage output indicating device 650, engineers can be aware of whether the output voltage VOAC is generated by the system for the electronic apparatus and use such information in system maintenance.

In addition, the switch driving circuit 670 is coupled between the output control switch 630 and the low phase delay detector 620, generates the drive signal DRV according to the enable signal EN generated by the low phase delay detector 620, and provides the drive signal DRV so that the output control switch 630 can be turned on or cut off.

Figure 8:
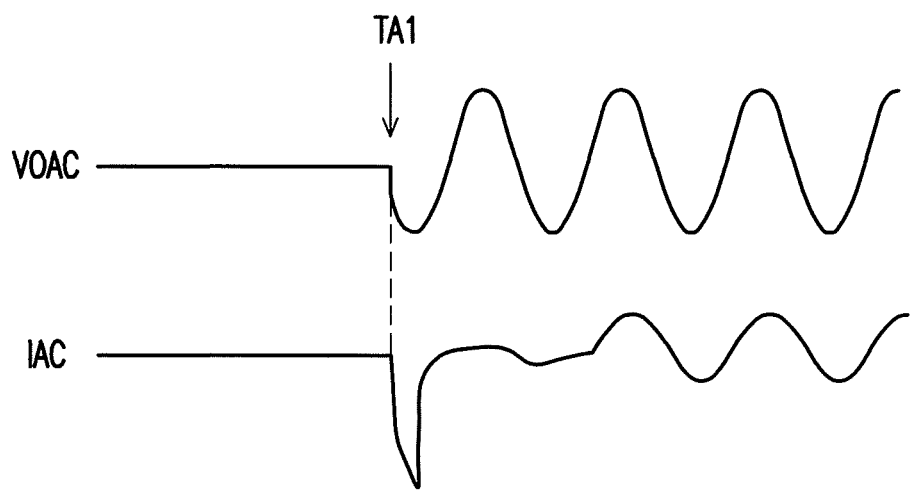
FIG. 8 illustrates a working waveform of the low phase surge protection device according to an embodiment of the invention.

The following refers to FIG. 8, and FIG. 8 illustrates a working waveform of the low phase surge protection device according to an embodiment of the invention. In the drawing, the output voltage VOAC is generated at a time point TA1, and the AC input voltage is in the low phase state (e.g., less than 20°) at the time point TA1. Under such condition, a current value of a current IAC generated when the output control switch is turned on (at the time point TA1) may be effectively controlled from causing damages on the electronic components.

In summary, according to the invention, after the AC input voltage is stabilized, the output control switch is turned on by detecting the phase of the AC input voltage to generate the output voltage at the time point when the AC input voltage is relatively low. Accordingly, the possible energy of the surge current generated at the moment when the output voltage is provided may be effectively reduced so as to lower the probability of electronic components being damaged.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A low phase surge protection device, comprising:
   a voltage converter, receiving an alternate current (AC) input voltage, and converting the AC input voltage to generate a direct current (DC) input voltage;
   a low phase delay detector, coupled to the voltage converter, receiving the DC input voltage to be a power voltage, enabling a phase detection scheme by detecting whether the AC input voltage is in a stable state, and generating an enable signal by detecting a phase of the AC input voltage after the phase detection scheme is enabled; and
   an output control switch, coupled to the low phase delay detector, receiving the AC input voltage, and determining whether to transmit the AC input voltage to be an output voltage according to the enable signal.

2. The low phase surge protection device according to claim 1, wherein the phase detector comprises:
   a stable voltage detector, receiving the AC input voltage, and determining whether to enable the phase detection scheme according to a comparison of a voltage peak of the AC input voltage with a first reference voltage; and
   a phase detector, coupled to the stable voltage detector, wherein the phase detector generates the enable signal according to a comparison of a voltage value of the AC input voltage with a second reference voltage after the phase detection scheme is enabled;
   an over-voltage protection circuit, coupled to the phase detector, receiving the AC input voltage, generating an over-voltage protection signal according to a comparison of the voltage peak of the AC input voltage with a third reference voltage, wherein the over-voltage protection signal is configured to determine whether to enable an over-voltage protection action.

3. The low phase surge protection device according to claim 2, wherein the stable voltage detector enables the phase detection scheme when the voltage peak of the AC input voltage is greater than the first reference voltage.

4. The low phase surge protection device according to claim 2, wherein after the phase detection scheme is enabled, the phase detector enables the enable signal and turns on the output control switch when the voltage value of the AC input voltage is smaller than the second reference voltage.

5. The low phase surge protection device according to claim 2, wherein the stable voltage detector comprises:
   a voltage regulator, performing voltage-conversion, rectification and filter operations on the AC input voltage to obtain a regulated input voltage representing the voltage peak of the AC input voltage; and
   a comparator, coupled to the voltage regulator, receiving the regulated input voltage and the first reference voltage, and generating a determination signal according to a comparison of the regulated input voltage with the first reference voltage.

6. The low phase surge protection device according to claim 5, wherein the stable voltage detector further comprises:
an auxiliary circuit, receiving the determination signal, and generating an auxiliary signal according to the determination signal.

7. The low phase surge protection device according to claim 6, wherein the comparator comprises:
an operational amplifier, having a positive input terminal receiving the regulated input voltage, a negative input terminal of the operational amplifier receiving the first reference voltage, an output terminal of the operational amplifier generating the determination signal; and
a feedback resistor, coupled between the positive input terminal of the operational amplifier and the output terminal of the operational amplifier,
wherein the operational amplifier receives the DC input voltage to be the power voltage.

8. The low phase surge protection device according to claim 7, wherein the stable voltage detector further comprises:
a regulator circuit, coupled to the negative input terminal of the operational amplifier, and generating the first reference voltage according to the DC input voltage.

9. The low phase surge protection device according to claim 8, wherein the regulator circuit comprises:
a capacitor, coupled between the negative input terminal of the operational amplifier and a reference ground terminal;
a resistor, having one terminal receiving the DC input voltage and another terminal coupled to the negative input terminal of the operational amplifier; and
a Zener diode, having a cathode terminal coupled to the negative input terminal of the operational amplifier and an anode terminal coupled to the reference ground terminal.

10. The low phase surge protection device according to claim 6, wherein the auxiliary circuit comprises:
a first resistor, having a first terminal receiving the determination signal;
a first transistor, having a control terminal coupled to a second terminal of the first resistor;
a second resistor, having a first terminal receiving the DC input voltage and a second terminal coupled to a first terminal of the first transistor; and
a second transistor, having a first terminal generating the auxiliary signal and a control terminal coupled to the first terminal of the first transistor, wherein a second terminal of the second transistor and a second terminal of the first transistor are commonly coupled to a reference ground terminal.

11. The low phase surge protection device according to claim 6, wherein the over-voltage protection circuit comprises:
a voltage division circuit, dividing the AC input voltage;
an operational amplifier, comparing an output of the voltage division circuit with the third reference voltage;
a first resistor, serially connected between an output terminal and a positive input terminal of the operational amplifier;
a second resistor, coupled to the output terminal of the operational amplifier;
a third resistor, serially connected between the second resistor and a reference ground terminal; and
a transistor, having a control terminal coupled to a coupled terminal of the second terminal and the third terminal, a first terminal generating the over-voltage protection signal and a second terminal coupled to the reference ground terminal.

12. The low phase surge protection device according to claim 6, wherein the phase detector comprises:
a first voltage division circuit, receiving the determination signal, the auxiliary signal and the over-voltage protection signal, and generating the second reference voltage in accordance with the determination signal, in accordance with the auxiliary signal or in accordance with the over-voltage protection signal;
a second voltage division circuit, receiving the AC input voltage, and generating a divided input voltage by dividing the AC input voltage; and
an operational amplifier, having a positive input terminal receiving the second reference voltage and a negative input terminal receiving the divided input voltage, wherein the operational amplifier generates the enable signal at an output terminal thereof by comparing whether the second reference voltage is greater than the divided input voltage.

13. The low phase surge protection device according to claim 12, wherein the phase detector further comprises:
a diode, having an anode coupled to an output terminal of the operational amplifier and a cathode coupled to the positive input terminal of the operational amplifier; and
a resistor, coupled with the diode in series between the output terminal of the operational amplifier and the positive input terminal of the operational amplifier.

14. The low phase surge protection device according to claim 12, further comprising:
a switch driving circuit, coupled between the low phase delay detector and the output control switch, generating a drive signal according to the enable signal, and providing the drive signal so that the output control switch is turned on or cut off.

15. The low phase surge protection device according to claim 14, wherein the switch driving circuit comprises:
a first resistor, having one terminal receiving the enable signal;
a second resistor, coupled between a second terminal of the first resistor and a reference ground terminal;
a transistor, having a control terminal coupled to a second terminal of the first resistor and a first terminal coupled to the reference ground terminal;
a capacitor, coupled between the control terminal of the transistor and the reference ground terminal; and
a diode, having a cathode receiving the DC input voltage and an anode coupled to a second terminal of the transistor,
wherein the drive signal is provided between the cathode and the anode of the diode.

16. The low phase surge protection device according to claim 1, wherein the low phase delay detector further receives a power supply command, and enables the phase detection scheme according to the power supply command.

17. The low phase surge protection device according to claim 1, further comprising:
a surge protection device, coupled between paths of the voltage converter and the output control switch for receiving the AC input voltage, and executing a surge protection operation on the AC input voltage.

18. The low phase surge protection device according to claim 17, wherein the surge protection device is a voltage-sensitive resistor.

19. The low phase surge protection device according to claim 1, further comprising:
a voltage output indicating device, coupled to a node of the output control switch for generating the output voltage, and configured to indicate whether the output voltage is generated.

20. The low phase surge protection device according to claim 19, wherein the voltage output indicating device is an indicating light.

21. The low phase surge protection device according to claim 1, wherein the output control switch is a solid-state switch.

22. The low phase surge protection device according to claim 1, wherein after the phase detection scheme is enabled, the low phase delay detector generates the enable signal according to whether the phase of the AC input voltage is less than 20°, and turns on the output control switch through the enable signal when the phase of the AC input voltage is less than 20°.

* * * * *